US012552532B2

(12) United States Patent
Alves

(10) Patent No.: US 12,552,532 B2
(45) Date of Patent: Feb. 17, 2026

(54) METHOD FOR LANDING A KITE SYSTEM, AND KITE SYSTEM

(71) Applicant: SkySails Power GmbH, Hamburg (DE)

(72) Inventor: Benjamin Alves, Hannover (DE)

(73) Assignee: SkySails Power GmbH, Hamburg (DE)

( * ) Notice: Subject to any disclaimer, the term of this patent is extended or adjusted under 35 U.S.C. 154(b) by 0 days.

(21) Appl. No.: 18/841,892

(22) PCT Filed: Feb. 21, 2023

(86) PCT No.: PCT/EP2023/054290
§ 371 (c)(1),
(2) Date: Aug. 27, 2024

(87) PCT Pub. No.: WO2023/161216
PCT Pub. Date: Aug. 31, 2023

(65) Prior Publication Data
US 2025/0171140 A1    May 29, 2025

(30) Foreign Application Priority Data
Feb. 28, 2022 (EP) .................................... 22159173

(51) Int. Cl.
*B64C 31/06* (2020.01)
(52) U.S. Cl.
CPC .................................. *B64C 31/06* (2013.01)
(58) Field of Classification Search
CPC ............... B64C 31/06; B64C 31/0285; B64C 2031/065; B64U 2101/10; F03D 5/015;
(Continued)

(56) References Cited

U.S. PATENT DOCUMENTS 3,534,931 A * 10/1970 Rogallo ................ B64C 31/036
244/138 R
4,065,079 A * 12/1977 Winchurch .......... B64D 17/343
244/152

(Continued)

FOREIGN PATENT DOCUMENTS

CN      207550464 U     6/2018
DE      202011107010 U1 2/2012
EP         3456630 A1   3/2019

OTHER PUBLICATIONS

PCT International Search Report and Written Opinion for International Application No. PCT/EP2023/054290 filed Feb. 21, 2023; Date of Mailing: May 8, 2023; 12 pgs.

*Primary Examiner* — Richard Green
(74) *Attorney, Agent, or Firm* — Alix, Yale & Ristas, LLP

(57) ABSTRACT

Method for landing a kite system (23), in which the kite system (23) comprises a kite (14) and a control pod (25). The kite (14) is held on the control pod (25) via a line system (24). The control pod (25) is held during normal operation of the kite system (23) via a tether (15) on a ground-based attachment point (16, 44). A sail surface of the kite (14) is spanned by a first kite part (40) and a second kite part (41). A connection (36) which exists in the sail surface between the first kite part (40) and the second kite part (41) is separated such that the kite (14) assumes a different aerodynamic state and falls to the ground with the control pod (25). The invention also relates to a kite system.

12 Claims, 6 Drawing Sheets

(58) Field of Classification Search
CPC .. F03D 7/051; F03D 9/322; F05B 2240/9172; F05B 2240/9176; F05B 2240/92; F05B 2240/921; F05B 2240/923; B63H 8/18; B63H 8/50; B63H 8/70; B63H 9/072; B64B 1/46; B64B 1/48
See application file for complete search history.

(56) References Cited

U.S. PATENT DOCUMENTS

| | | | | |
|---|---|---|---|---|
| 6,845,948 | B2* | 1/2005 | Thomas | B63H 8/16 244/155 A |
| 7,287,481 | B1 | 10/2007 | Wrage et al. | |
| 8,963,362 | B2* | 2/2015 | Sia | B64U 10/60 290/55 |
| 9,908,609 | B1* | 3/2018 | Fourie | B64B 1/46 |
| 10,336,412 | B2* | 7/2019 | Morris | B63H 8/16 |
| 11,338,896 | B2* | 5/2022 | MacCallum | B64B 1/40 |
| 11,780,552 | B2* | 10/2023 | MacCallum | B64B 1/40 244/31 |
| 2007/0157868 | A1* | 7/2007 | Wrage | B63H 9/072 114/365 |

\* cited by examiner

METHOD FOR LANDING A KITE SYSTEM, AND KITE SYSTEM

BACKGROUND

The invention relates to a method for landing a kite system. The kite system comprises a kite and a control pod, wherein the kite is held on the control pod via a line system. In normal operation of the kite system, the control pod is held on a ground-based attachment point via a tether. The invention also relates to a kite system.

The kite can be moved by suitable adaptation of the aerodynamic properties along flight paths which are oriented essentially at right angles to the tether and in this way exert a tensile force on the tether.

Safety mechanisms are desirable for the operation of such a kite by means of which it is still possible for control to be exerted over the kite even when maintaining normal operation is impossible. It could, for example, be that an operating state occurs in which the control system fails and the kite can no longer be controlled proactively. If in this state the kite exerts a high tensile force on the tether, in some circumstances it is not possible to reel in the tether. A situation can also occur in which it is not possible to reel in the kite because of failure of the tether winch. In the case where the tether tears, it is known from EP 3 456 630 A1 to bridge the rupture point with a catch device. Because the catch device requires a certain distance in order to be able to absorb the high forces, some of the flight height which can be used in normal operation is lost.

SUMMARY

The object of the invention is to propose a method and a kite system such that the kite system can be landed reliably and safely even outside normal operation. Starting from the prior art mentioned, the object is achieved by the features of the independent claims. Advantageous embodiments are provided in the dependent claims.

In the method according to the invention, a sail surface of the kite is spanned by a first kite part and a second kite part. A connection which exists in the sail surface between the first kite part and the second kite part is separated such that the kite assumes a different aerodynamic state and falls to the ground with the control pod.

The invention has recognized that separating a connection which exists in the sail surface between the first kite part and the second kite part provides a way to quickly and reliably modify the aerodynamic state of the kite such that the tensile force is reduced. After the connection has been separated, an aerodynamic state is assumed in which the lift force exerted by the kite is no longer sufficient to keep the kite system in the air. The kite and the control pod connected thereto fall to the ground, the kite acting as a parachute.

In particular, the kite can act in this state as a deceleration parachute such that, in the case of high rope loads, the tension energy in the rope is diminished without the rope experiencing an abrupt reduction in load. Abrupt reductions in load are undesired because they can cause the tether to jump off the pulleys at the ground station. If the tether is prevented from jumping, the tether can be reeled in further despite the emergency landing system being triggered. The method is preferably performed such that, after the triggering, the kite assumes a state in which it rotates about the axis of tether such that the kite falls to the ground under low load but with a tensioned tether.

The sail surface refers to the area of the kite along which the air flows when the kite is moved along flight paths. The sail surface can comprise an inner surface facing the control pod and an outer surface facing away from the control pod. The inner surface and the outer surface can be spaced apart from each other and span an airfoil. The connection can extend in the direction of the airfoil such that both the first kite part and the second kite part form a complete airfoil before the separation. The direction of the airfoil is designated as the longitudinal direction of the kite. Viewed in the transverse direction, the first kite part can be arranged next to the second kite part.

An attachment point is ground-based if it is not lifted off the surface of the ground by the tensile force of the kite. A ground-based attachment point can be connected fixedly to the ground. Ground-based attachment points on a ship, on a floating pontoon or on a mobile system on land are, for example, also possible.

During normal operation of the system, a connection between the first kite part and the second kite part is formed in the sail surface. The connection can form a continuous transition between the first kite part and the second kite part. The connection can be designed such that the sail surface and/or the airfoil are not interrupted in the region of the connection.

The method can be performed such that the first kite part and the second kite part are completely separated from each other such that, after the separation, there is no longer any connection within the sail surface between the first and the second kite part. In another embodiment, the first kite part and the second kite part are partially separated from each other such that, even after the separation, a connection still exists in the sail surface between the first kite part and the second kite part.

The first kite part and the second kite part can be of the same size such that the separation takes place in the centre of the kite. Two kite parts of different sizes are also possible such that the kite is separated off-centre.

The kite can comprise more than two kite parts. In each case, two of the kites involved span a sail surface within the sense of the invention. The kite parts can be arranged next to each other in the transverse direction of the kite such that a central kite part is included in each case between two kite parts which adjoin each other in the transverse direction. A connection, which is separated when performing the method according to the invention, can be formed between in each case two adjacent kite parts. Even relatively large kites can be landed reliably by separating them into more than two kite parts.

The separation of the kite parts can be triggered by a trigger element. The kite system can thus be configured such that the trigger element is automatically triggered when it is not possible to maintain normal operation of the kite system. The trigger element can be triggered following an exceptional event. The exceptional event as a result of which it is not possible to maintain normal operation can consist, for example, in a line of the line system, or the tether, tearing or in an excess load acting on a line of the line system or on the tether. The exceptional event can also consist of a situation being determined in a control unit in which one or more operating parameters of the kite system lie outside the normal range.

In addition or as an alternative to independent triggering, the possibility can be provided that the trigger element is triggered by intervention from outside. The intervention can take place, for example, if an operator notices that the kite system has assumed an irregular state. The intervention can consist, for example, of the operator making an input or activating a switch.

The trigger signal can be transmitted to the trigger element mechanically. For example, the trigger element can be coupled mechanically to a rope such that the trigger element is triggered when the rope tears or is overloaded. The trigger signal can also be a control signal which is communicated to the trigger element electronically. In particular, the control signal can be communicated by cable or via a radio connection to the trigger element.

The kite can have a predetermined separation point at which the connection between the first kite part and the second kite part is separated. The predetermined separation point can be provided with a securing device such that the connection between the first kite part and the second kite part is maintained as long as the securing device is active. The predetermined separation point can be designed such that the connection between the first kite part and the second kite part is separated by the exertion of the aerodynamic forces acting on the sail surface when the securing device is no longer active.

The predetermined separation point can comprise a zip by means of which the first kite part and the second kite part are connected to each other. The zip can be held in the closed state by the securing device. A section of the zip can be undone by releasing the securing device, as a result of which the zip can open lengthwise. The zip can continue to open in one direction or in both directions, starting from the undone section. In one embodiment, the zip is designed such that a number of teeth are missing or do not engage in the region in which the securing device is arranged.

In other variants, the kite parts can be connected at the predetermined separation point with a material which is less tear-resistant than the adjoining material of the sail surface such that the material of the predetermined separation point tears after the securing device has been released. Also possible is a seam which comes undone lengthwise after the securing device has been released. In another embodiment, a fuse extends along the predetermined separation point which is ignited by a trigger element. The material of the kite can be weakened at the predetermined separation point by the fuse such that it tears.

The predetermined separation point can be designed such that it is separated after the securing device has been released under the influence of the aerodynamic forces occurring during normal operation of the kite system.

It is also possible that, in order to separate the connection, the kite is brought into a state in which higher aerodynamic forces act at the predetermined separation point than during normal operation of the kite system. The method can be performed such that the higher aerodynamic forces directly cause separation of the predetermined separation point. Alternatively, the separation of the predetermined separation point can be effected by the release of a securing device and the higher aerodynamic forces in combination.

The line system between the control pod and the kite can comprise a plurality of lines via which the tensile forces are transmitted from the kite to the control pod. The line system can comprise lines designed as active steering lines, the free length of which between the control pod and the kite can be adjusted. The kite can be steered by activating the active steering lines such that it moves along the desired flight paths. The line system can comprise lines designed as fixed lines, by means of which sections of the kite are held a fixed distance apart. The line system can comprise lines designed as passive steering lines which extend between a first attachment point on the kite and a second attachment point on the kite and which are deflected between the attachment points at a pulley connected to the control pod. The distance between the control pod and the first attachment point, and the distance between the control pod and the second attachment point, can be changed using such passive steering lines, wherein the sum of the two distances remains constant. The fixed lines can be arranged in a section of the kite which is central relative to the transverse direction. The steering lines can be arranged in a peripheral section of the kite. The passive steering lines can be arranged relative to the transverse direction in a section of the kite which is situated between the central section and the peripheral section.

The kite system can be configured such that a line of the line system is severed by the triggering of the trigger element. In order to enable the severing triggered by the trigger element, the line or a holding element connected to the line can be provided, for example, with a pyro cutter or with a compressed-air shackle. If there is no longer any tensile force acting on the relevant section of the kite, the section moves away from the control pod. The relevant movement of the kite can be used in order to release the securing device. For example, a securing line can extend from the control pod to the securing device via the relevant section of the kite such that a tensile force is exerted on the securing device by the movement in the kite. The line which is severed by the triggering element can be a fixed line.

The kite can be designed such that a cavity surrounded by an outer skin is enclosed between the outer surface and the inner surface of the kite. During normal operation of the kite system, an elevated pressure can exist which is higher than the ambient pressure by, for example, 50 mbar to 1000 mbar, preferably by 100 mbar to 500 mbar. The elevated pressure can be supplied by the air flow which flows along the sail surface when the kite moves along flight paths. The kite can have an inlet opening which is arranged between the outer surface and the inner surface of the kite. In particular, the inlet opening can be arranged in an end surface of the kite which faces the direction of movement.

By separating the connection between the first kite part and the second kite part, an opening through which an elevated pressure which exists inside the kite escapes can be created in the outer skin of the kite. The escape of the elevated pressure can modify the aerodynamic state of the kite such that the tensile force acting in the direction of the control pod is reduced.

The invention moreover relates to a kite system with a kite and a control pod. The kite is held on the control pod via a line system. A sail surface of the kite is spanned by a first kite part and a second kite part. A connection between the first kite part and the second kite part is formed in the sail surface. The kite system comprises a trigger element for separating the connection such that the kite assumes a different aerodynamic state after the connection has been separated and falls to the ground with the control pod.

The kite system can comprise a tether which extends between the control pod and a ground-based attachment point. The attachment point can be a constituent part of a component of the kite system which is connected fixedly to the ground. The kite system can be an element of an apparatus for generating electrical energy. The apparatus can comprise a generator which is driven via a tether winch. It is also possible that the kite system is connected to an attachment point of a ship such that motive power for the ship can be generated by means of the kite system. An attachment point of a ship is a ground-based attachment point within the sense of the invention.

The kite system can be further developed with further features which are described in connection with the method according to the invention. The method can be further developed with further features which are described in connection with the kite system according to the invention.

BRIEF DESCRIPTION OF THE DRAWINGS

The invention is described by way of example below with the aid of advantageous embodiments with reference to the attached drawings, in which.

DETAILED DESCRIPTION

Figure 1:
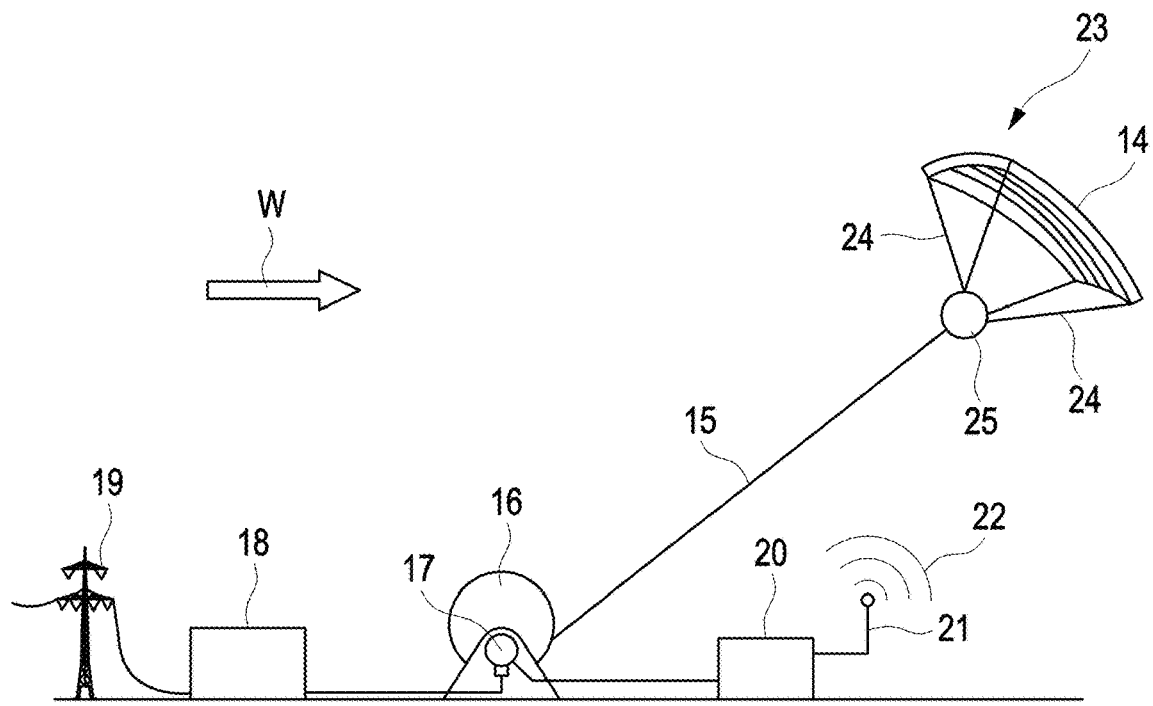
FIG. 1: shows a schematic illustration of an apparatus according to the invention.

An apparatus according to the invention for generating electrical energy comprises according to FIG. 1 a kite system 23 according to the invention which is connected to a tether winch 16 via a tether 15. The kite system 23 comprises a kite 14 which is connected to a control pod 25 via a line system 24.

Coupled to the tether winch 16 is a power driven device 17 which works as a generator in a first operating state and as a motor in a second operating state. The power driven device is connected to a public transmission grid 19 via an electrical power train 18 which comprises an inverter and a transformer such that either electrical energy generated by the power driven device 17 can be fed into the transmission grid 19 or the power driven device 17 can be operated as a motor by electrical energy taken from the transmission grid 19. The apparatus comprises a control unit 20 which is designed to control the interaction of the components of the apparatus.

The control unit 20 comprises an antenna 22 such that control signals can be exchanged with the control pod 25 via a radio connection 22. In particular, control signals are sent from the control unit 20 to the control pod 25 in order to control the flight path of the kite 14. The length of the steering lines of the line system 24 is modified using the control signals, as a result of which the flight direction of the kite 14 is influenced.

Figure 2:
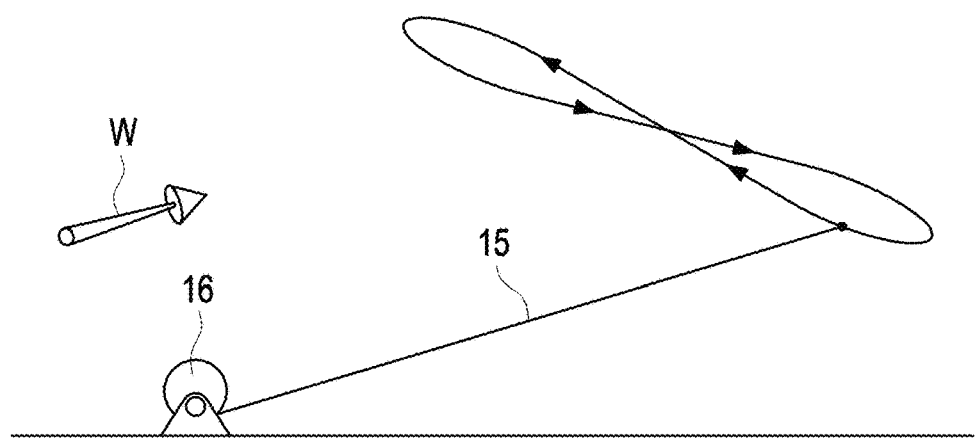
FIG. 2: shows a schematic illustration of an operating state of the apparatus from FIG. 1.

In the exemplary embodiment according to FIG. 2, the kite 14 is guided in a figure of eight oriented essentially transversely to the wind direction W. Whilst the kite 14 follows the flight path, a tensile force is exerted on the tether 15 by means of which the power driven device 17 is driven via the tether winch 16. The mechanical energy is converted into electrical energy and fed into the public transmission grid 19 via the power train 18 by means of the power driven device 17 operated as a generator in this operating state. It is also possible to store some of the generated energy in electrical form in an energy store of the power train 18. In this way, electrical energy can be generated until the length of the tether 15 is used up and all of the tether 15 has been let out from the tether winch 16. The tether 15 is then reeled in by the power driven device 17 operated as a motor before electrical energy can be generated again.

Figure 3:
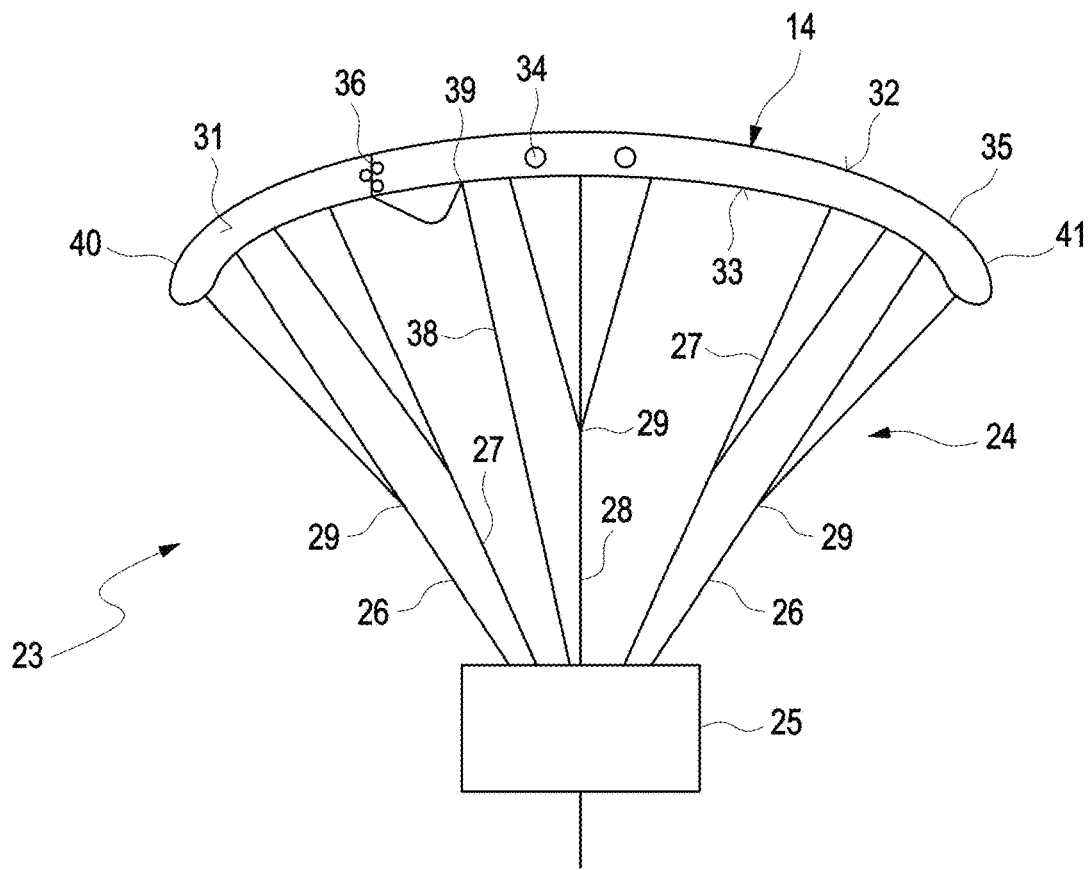
FIG. 3: shows a kite system according to the invention.

The line system 24 of the kite system 23 according to the invention comprises according to FIG. 3 active steering lines 26, passive steering lines 27 and fixed lines 28 which are each fastened to the control pod 25 and which branch out, starting from knot points 29, into a plurality of ends fastened to the kite 14. The fixed lines 28 extend from an end fixedly connected to the control pod 25 as far as a central section of the kite 14. The active steering lines 26, the length of which can be adjusted, extend from the control pod 25 as far as two peripheral sections of the kite 24. The passive steering lines 27, which are deflected by pulleys 30 at the control pod 25, are fastened on the kite 14 between the fixed lines 28 and the active steering lines 26.

The direction of movement of the kite 14 can be controlled by adjusting the length of the active steering lines 26. When the active steering lines 26 are adjusted, the passive steering lines 27 are moved at the same time over the pulleys 30, wherein the length of the passive steering lines 27 from the kite 14, over the pulleys 30 and back to the kite 14 remains unchanged.

The kite 14 forms an airfoil which extends in a longitudinal direction, starting from an end surface 31 visible in FIG. 3, over an outer surface 32 and an inner surface 33 as far as a rear end not visible in FIG. 3. A cavity which is at an elevated pressure during normal operation of the kite system is formed inside the kite 14. The kite 14 comprises openings 34, formed in the end surface 31, through which air can enter the inside and by means of which the elevated pressure is built up when the kite 14 is moving.

A zip 36, which, starting from the end surface 31, extends both over the outer surface 32 and over the inner surface 33 over the length of the airfoil as far as the rear end of the kite 14, is formed in the outer skin 35 of the kite 14. The zip 36 is closed during normal operation of the kite system. By opening the zip 36, the kite 14 can be separated into a first kite part 40 and a second kite part 41. Within the sense of the invention, the zip 36 connects the first kite part 40 and the second kite part 41 and forms a predetermined separation point between the first kite part 40 and the second kite part 41.

Figure 5:
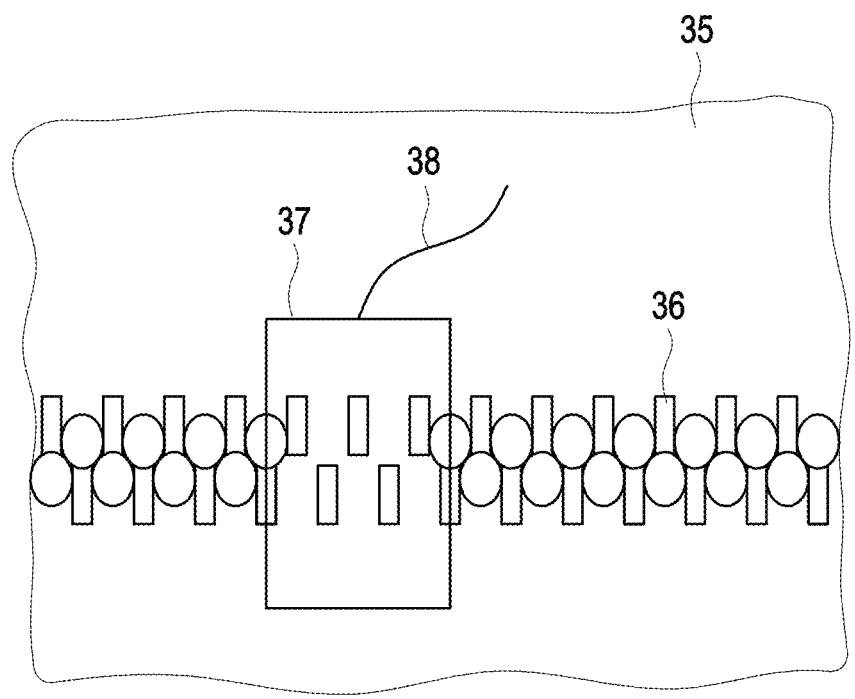
Figure 6:
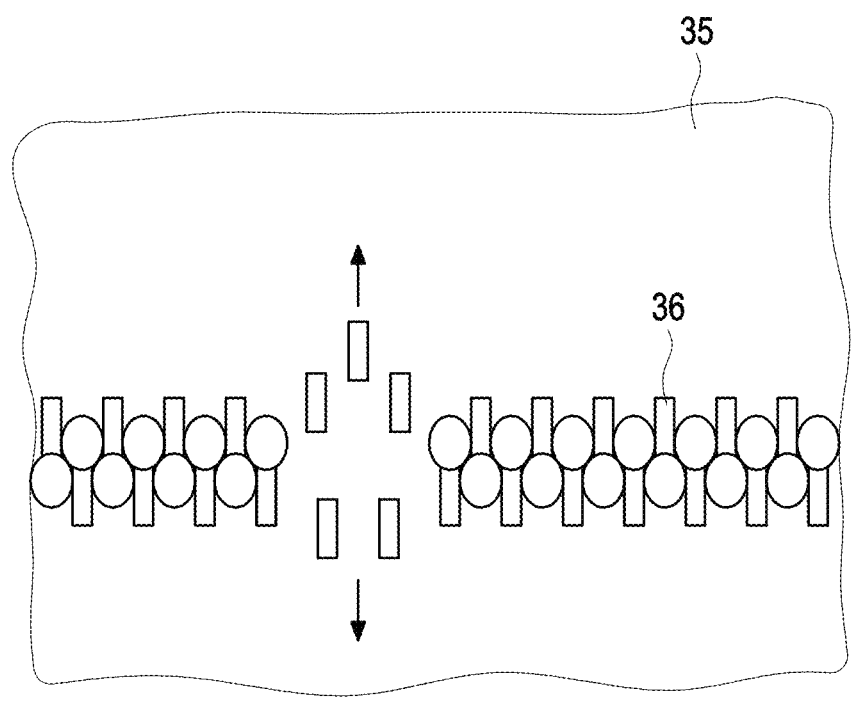
Figure 7:
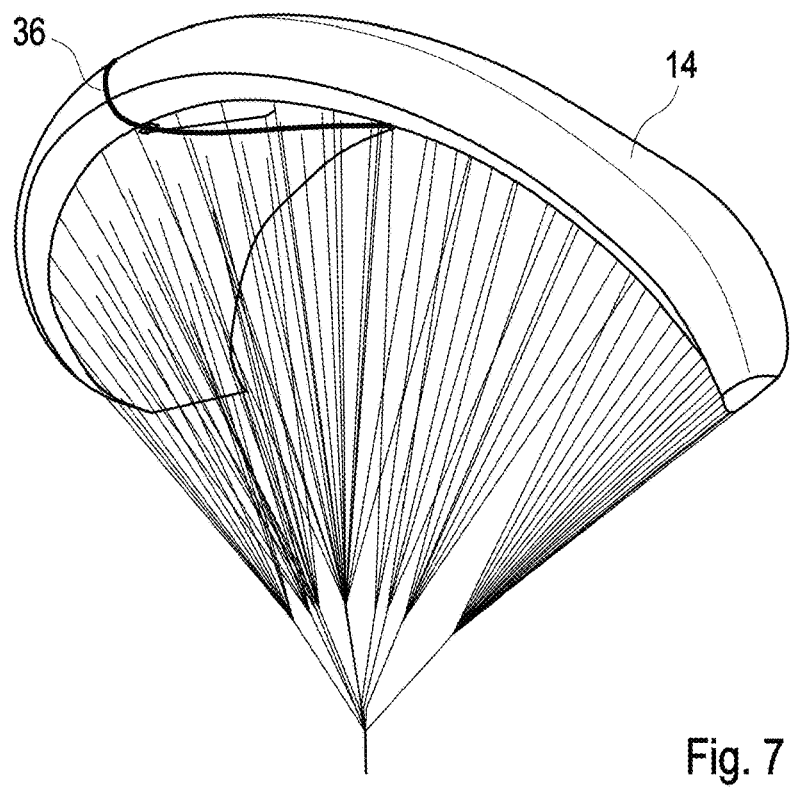
FIGS. 7-10: shows different states of a kite system according to the invention.

The zip 36 comprises according to FIG. 5 a section in which a plurality of teeth are removed and which is secured by a securing device 37. The securing device 37 extends over the zip 36 and holds the latter in a closed state despite the missing teeth. The securing device 37 can be removed by pulling on a trigger line 38, which has the consequence that the zip 36 can be undone lengthwise by forces acting transversely to the zip 36. A state of the zip 36 shortly after the securing device 37 has been removed is shown in FIG. 6 in which the zip 36 begins to open. By continuing to be pulled in a transverse direction, the zip 36 can be opened over its whole length, as a result of which the first kite part 40 and the second kite part 41 are separated from each other.

The trigger line 38 extends according to FIG. 3 from the control pod 25 via an attachment point 39 formed on the kite 14 as far as the securing device 37. If the fixed line 28 is detached, the central section of the kite 14 moves away from the control pod 25 such that the trigger line 38 is tensioned, as a result of which the securing device 37 is released. This has the consequence that the zip 36 opens lengthwise such that the kite 14 is separated into the first kite part 40 and the second kite part 41. The opening of the zip 36 creates an opening in the outer skin 35 of the kite 14 through which the elevated pressure escapes. The first kite part 40 and the second kite part 41 each act in this state as a parachute on which the control pod 25 falls to the ground.

Figure 4:
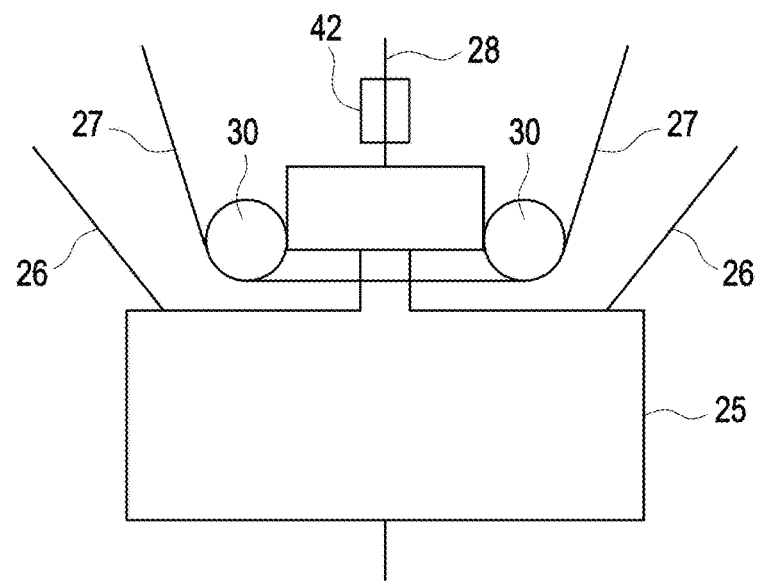
FIGS. 4-6: show details of the kite system from FIG. 3 in an enlarged illustration.

According to FIG. 4, a pyro cutter 42 is arranged in a section, adjacent to the control pod 25, of the fixed line 28. The pyro cutter 42 can be triggered by an electrical signal, as a result of which the fixed line 28 is severed. The pyro cutter 42 forms a trigger element within the sense of the invention. The electrical signal for triggering the pyro cutter 42 can be provided and generated by the control unit 20 when an exceptional event occurs by virtue of which the kite system can no longer be operated in normal operation.

After the fixed line 28 has been severed, the central section of the kite 14 rises and thus moves away from the control pod 25, as a result of which tensile stress is applied to the trigger line 38. The securing device 37 is removed and the zip 36 opened such that the control pod falls to the ground with the two kite parts 40, 41 acting as a parachute.

Figure 8:
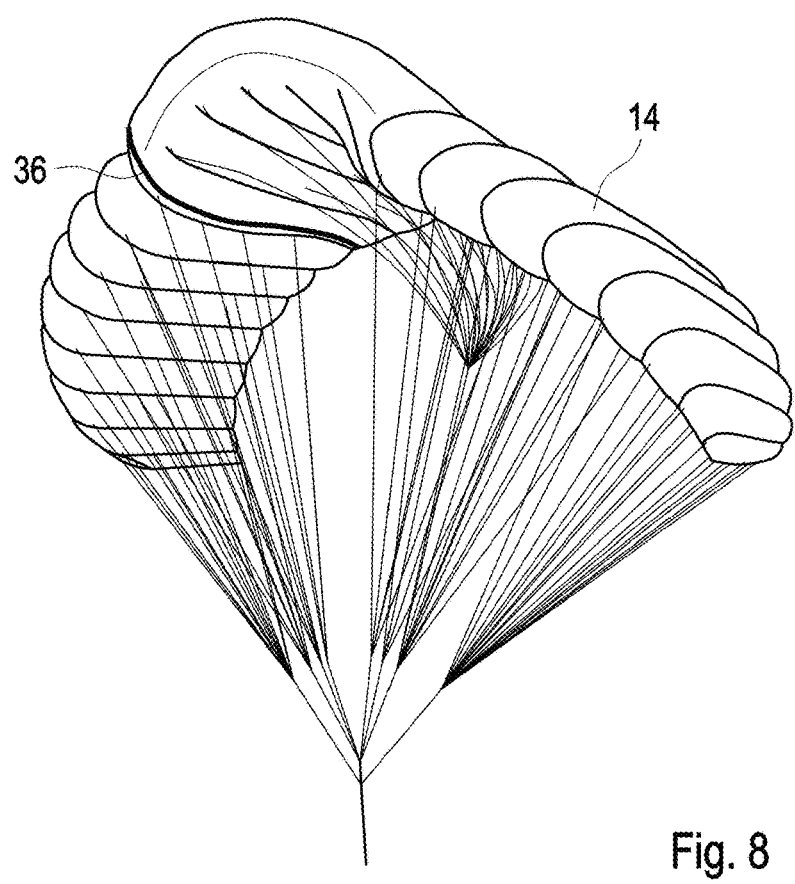
Figure 9:
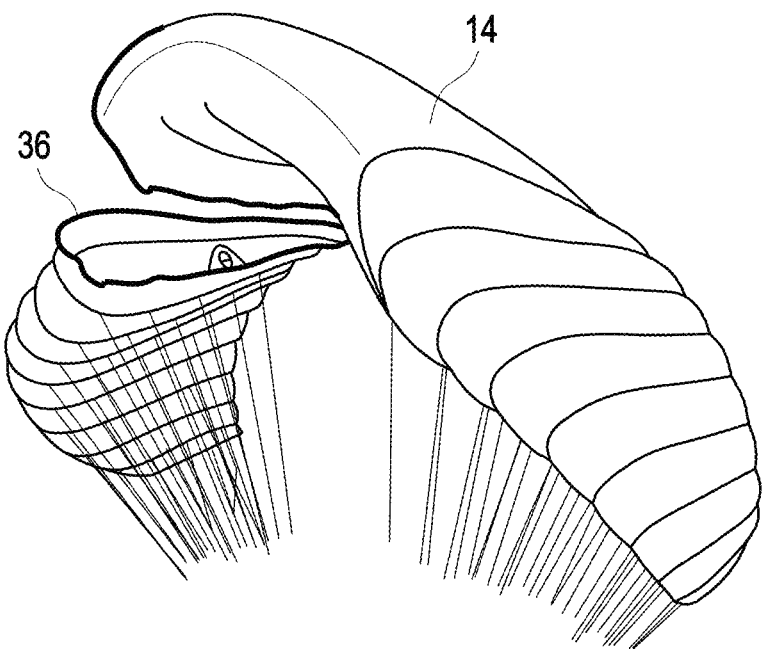
Figure 10:
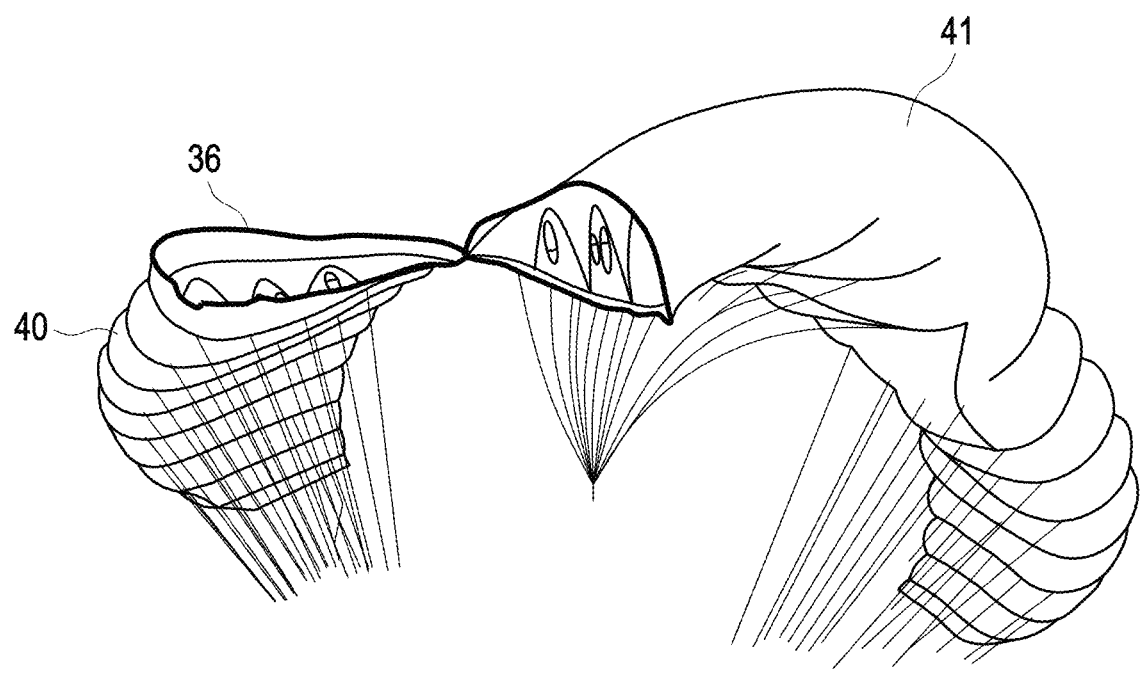

The relevant sequence is illustrated in FIGS. 7-10. The kite system 23 is shown in normal operation in FIG. 7. In FIG. 8, the fixed line 28 has been severed such that the central section of the kite 14 rises and the securing device 37 is detached from the zip 36. In FIG. 9, the zip 36 is partially undone. After the zip 36 has been completely undone, the two kite parts 40, 41 are separated from each other. When the elevated pressure escapes from the inside, the kite parts 40, 41 lose their aerodynamic profile and continue to act only as a parachute.

Figure 11:
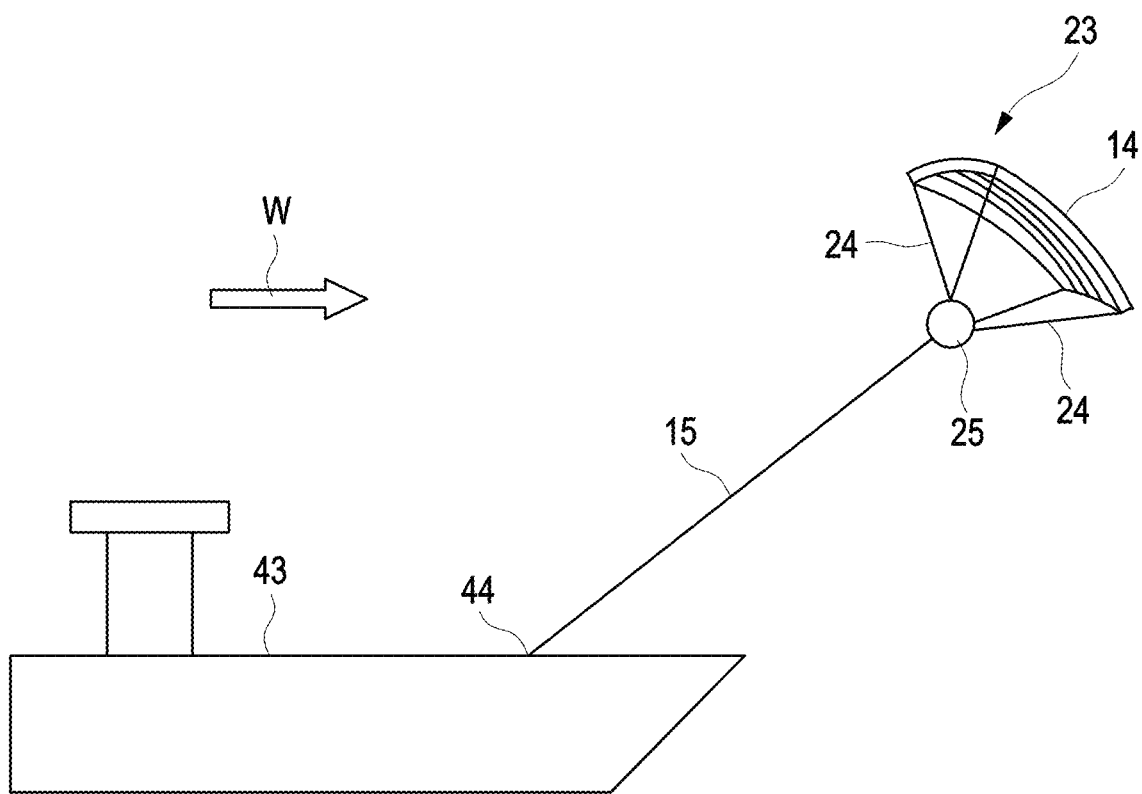
FIG. 11: shows an alternative embodiment of an apparatus according to the invention.

An alternative embodiment of the invention is shown in FIG. 11 in which the kite system 23 according to the invention is used in order to generate motive power for a ship 43.

The invention claimed is:

1. A method for landing a kite system (23), wherein the kite system (23) comprises a kite (14) and a control pod (25), wherein the kite (14) is held on the control pod (25) via a line system (24), and wherein the control pod (25) is held during normal operation of the kite system (23) via a tether (15) on a ground-based attachment point (16, 44), wherein a sail surface of the kite (14) is spanned by a first kite part (40) and a second kite part (41), and wherein a connection which exists in the sail surface between the first kite part (40) and the second kite part (41) is separated such that the kite (14) assumes a different aerodynamic state and falls to the ground with the control pod (25) wherein the kite (14) has a predetermined separation point which forms the connection between the first kite part (40) and the second kite part (41), the predetermined separation point is secured by a securing device (37) during normal operation of the kite system (23), and the predetermined separation point separates under the influence of aerodynamic forces occurring during normal operation of the kite system after the securing device is released.

2. The method of claim 1, wherein the sail surface comprises an inner surface (33) facing the control pod and an outer surface (32) facing away from the control pod, wherein the inner surface (33) and the outer surface (32) are spaced apart from each other and span an airfoil.

3. The method of claim 1, wherein the first kite part (40) and the second kite part (41) are completely separated from each other such that, after the separation, there is no longer any connection within the sail surface between the first kite part (40) and the second kite part (41).

4. The method of claim 1, wherein the separation of the connection is triggered by a trigger element (42).

5. The method of claim 4, wherein the trigger element (42) is triggered by a control signal from a control unit (20).

6. The method of claim 4, wherein, after the triggering of the trigger element (42), the kite (14) assumes an aerodynamic state in which the forces acting over the connection are higher than during normal operation of the kite system (23).

7. The method of claim 4, wherein lines (26, 27, 28) of the line system (24) are severed by the triggering of the trigger element (42).

8. The method of claim 1, wherein the predetermined separation point comprises a zip (36) by means of which the first kite part (40) and the second kite part (41) are connected to each other during normal operation of the kite system (23).

9. The method of claim 1, wherein the predetermined separation point is a zip (36) having teeth designed such that a number of teeth are missing or do not engage in a region in which the securing device (37) is arranged.

10. The method of claim 1, wherein, by separating the connection between the first kite part (40) and the second kite part (41), an opening through which an elevated pressure present inside the kite (14) escapes can be created in an outer skin (35) of the kite (14).

11. A kite system (23), comprising a kite (14) and a control pod (25), wherein the kite (14) is held on the control pod (25) via a line system (24), wherein a sail surface of the kite (14) is spanned by a first kite part (40) and a second kite part (41), and wherein a connection between the first kite part (40) and the second kite part (41) is formed in the sail surface, wherein the connection includes a predetermined separation point secured by a securing device during normal operation of the kite system, and after release of the securing device, the predetermined separation point separates under the influence of aerodynamic forces acting on the first and second kite parts (40, 41) during normal operation of the kite system, said kite system (23) further comprising a trigger element (42) for separating the connection such that, after separating the connection, the kite (14) assumes a different aerodynamic state and falls to the ground with the control pod (25).

12. The kite system of claim 11, wherein the control pod (25) is held on a ground-based attachment point (16, 44) during normal operation of the kite system (23) via a tether (15).

* * * * *